United States Patent Office 3,169,459
Patented Feb. 16, 1965

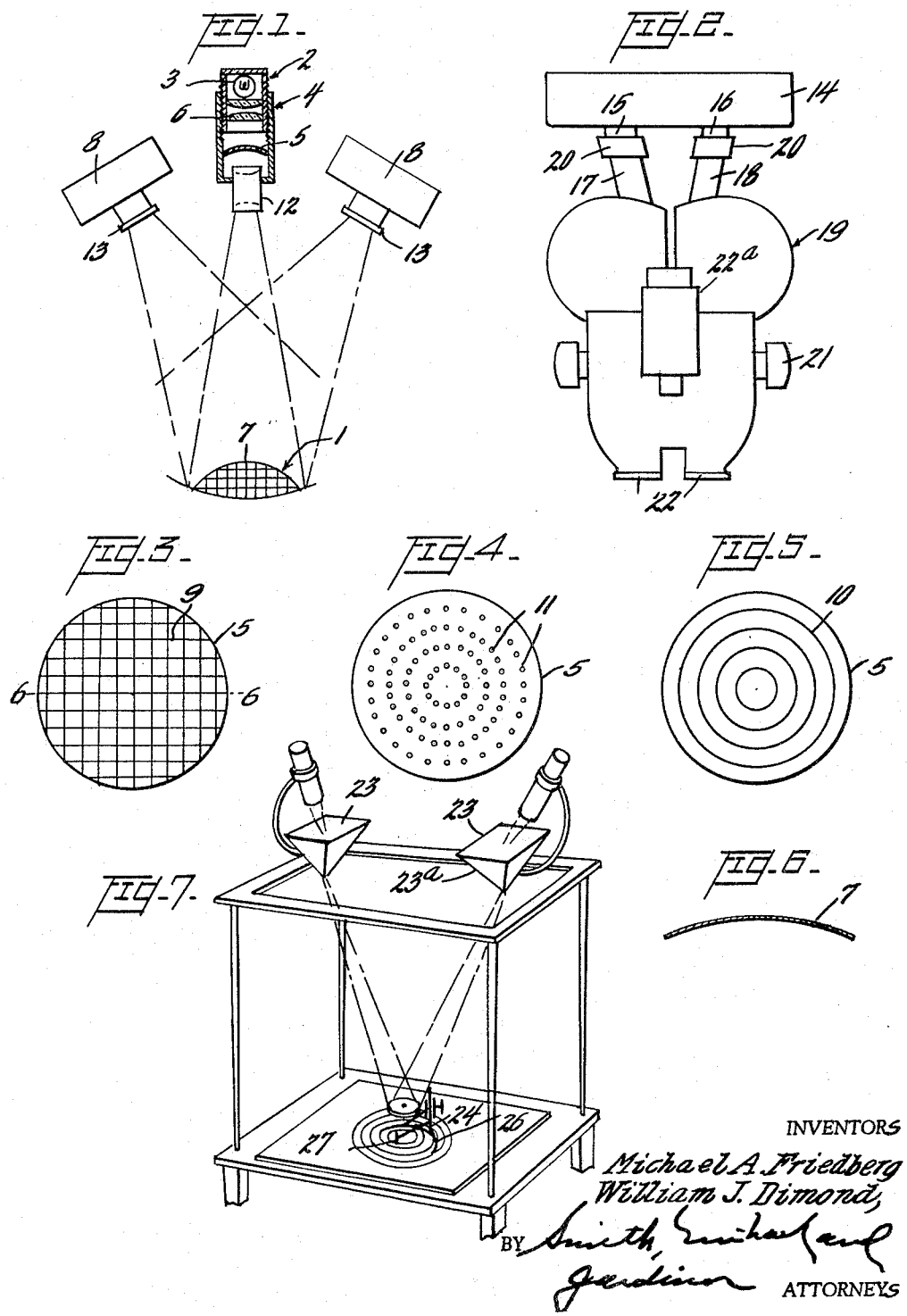

3,169,459
METHOD OF DETERMINING SURFACE
CONTOURS OF AN EYE
Michael A. Friedberg, 6663 Ridgeville St., Pittsburgh, Pa., and William J. Dimond, Pittsburgh, Pa. (1941 Shady Oak Circle, Allison Park, Pa.)
Filed Mar. 11, 1963, Ser. No. 264,400
7 Claims. (Cl. 95—18)

This invention relates to a method of ascertaining the surface contours of an eye to be fitted with a contact lens.

Those skilled in the art of making and fitting contact lenses have long been cognizant of the fact that their efforts to determine with any degree of precision the surface contours of the cornea and sclera of an eye have been hampered by the inherent physical properties of the eye and in particular, the non-rigid and substantially transparent nature of the tear layer which overlies the exposed portions of the cornea and sclera of the eye, on which or from which a contact lens is supported. The non-rigid or semi-fluid substance of the tear layer practically precludes successful use of instruments for determining these contours, and the transparent nature of the tear layer precludes successful conventional photographic reproductions of the eye.

With these facts in mind, the present invention has for its object a method by which the transparent tear layer which overlies the cornea and sclera of the eye is temporarily rendered photographically reproducible by means which insures the preservation of the natural surface contours thereof. The application of opaque pigment layers to the eye as has been suggested in the past tends to destroy or distort the natural contours of the tear layer to a certain extent as to render impractical the accurate fitting of a contact lens to the eye.

A further object of the invention is to provide a method of rendering the transparent tear layer covering the anterior epithelium of an eye photographically reproducible by depicting on the exposed surface of said layer a pattern comprising contiguous areas of contrasting light density.

A further object of the invention is to render the surface contours of the tear layer of an eye photographically reproducible by optically projecting upon the exposed surface of said layer a pattern comprising adjacent pattern delineations of contrasting light density and then stereoscopically photographing the areas of the tear layer on which said pattern is projected.

A further object of the invention is to provide a method by which the surface contours of the tear layer of an eye may be rendered temporarily photographically reproducible, then stereoscopically photographing the eye and using the stero-negatives of said photographs to determine the surface contours of the eye of stereophotogrammetry.

A further object of the invention is to provide in a method of the character described the use of a biological stain within the tear layer of the eye, said stain being visually responsive to ultraviolet light, and projecting onto the eye in which said stain has been added, ultraviolet light, at the time the stereophotograph of the eye is taken.

These and other objects of the invention will become apparent from the following specification read in the light of the accompanying drawings, wherein is illustrated diagrammatically, the manner of practicing the invention herein described, and wherein FIG. 1 is a diagrammatic view showing the general relationship of the eye, the light projector, and the stereocameras, FIG. 2 shows a modified arrangement wherein a microscopic lens system is inserted between the stereocameras and the object to secure desired magnification, FIGS. 3, 4 and 5 are diagrammatic views of different forms of light filters or screens employed in the projector, FIG. 6 is a transverse sectional view of a light screen such as shown in FIGS. 3, 4 and 5, taken on the line 6—6 of FIG. 3, and FIG. 7 is a diagrammatic view illustrating a conventional form of apparatus for photogrammetrically reproducing the surface contours of the tear layer as shown in the stereonegatives.

In practicing the invention, the apparatus employed is disposed substantially as shown diagrammatically in FIG. 1 where the eye being photographed is illustrated at 1. A conventional light projector 2 including a source of light 3, a lens system 4, and a light filter or screen 5 is positioned to direct a beam of light upon the eye 1 and to optically project on the tear layer of the eye which overlies the anterior epithelium of the cornea and sclera an optical image of the pattern embodied in the light filter 5. The projector 2 and the lens system thereof represented by the reference character 4, are provided with conventional focusing means such as represented by the screw threads shown at 6, so that the pattern carried by the light screen 5 may be accurately focused upon the exposed surfaces of the tear layer of the eye which overlies the cornea and sclera thereof. The optical image of the pattern carried by the light filter 5 is diagrammatically shown on the eye 1 by the reference character 7.

The eye 1 with the pattern 7 optically projected thereon, as described, is then photographed by conventional stereocameras indicated generally at 8. It will be understood that the optical image of the pattern or grid 7 will, by diffuse reflection, render the surface from which it is reflected, visible, for photographic reproduction.

The light filter or slide 5 is preferably concave-convex as shown in cross section in FIGS. 1 and 6 in order to facilitate accurate focusing of the optical image thereof on the exposed surface of the eye. The actual pattern carried by the filter 5 is not critical and can take any desired form such as the grid pattern 9 shown in FIG. 3 or a series of concentric circles 10 as shown in FIG. 5. Thus, the pattern may comprise intersecting straight lines, or non-intersecting straight lines, or intersecting or non-intersecting curved lines, or small isolated juxtaposed areas (see FIG. 4). Furthermore, the pattern depicted on the filter or slide 5 may be delineated in black and white, contrasting colors, or any convenient form in which the delineations of the pattern or screen are depicted on the surface of the tear layer of the eye in contiguous areas of contrasting light densities.

In order to enhance the visibility of the tear layer of the eye and thus increase the photographic reproducibility thereof, there may be added to the eye a biological stain. Furthermore, a stain may be chosen which is responsive visually to some predetermined light wave such as ultraviolet light, and with this in mind a biological stain known as fluorescein has been used effectively. FIG. 2 of the drawings illustrates diagrammatically the arrangement of the apparatus in photographing an eye in which a biological stain such as fluorescein has been added. Thus, the eye is flooded with light from any suitable ultraviolet light source at the time the stereophotograph is taken. By way of example, a cobalt-blue filter may be associated with the projector 2. This is shown diagrammatically at 12 in FIG. 1. It will be understood, of course, that the fluorescein, or such other biological stain as is used for enhancing the visibility of the tear layer of the eye by accentuating the color contrasts between adjacent areas of the tear layer within the optically projected image of the screen 5, may be readily washed out after the photographic operation has been completed. Furthermore, filters such as a Wratten 2–B may be placed over the camera lenses as shown at 13 in FIG. 1 to obtain optimum pictures when using ultraviolet light.

It will be appreciated by those skilled in the art that by using a biological stain such as here described, the eye is rendered more visible for photographic reproduction and at the same time, the natural surface contours of the tear layer of the eye are not disturbed or distorted as might be occasioned by the addition to the eye of certain physical layers of pigment as has been suggested in some prior but unsuccessful methods of procedure.

In the modification shown in FIG. 2 a conventional stereo-camera is shown at 14 and the twin lenses thereof 15 and 16 are optically coupled to the ocular lenses 17 and 18 of a conventional double barrel microscope 19 by coupling devices 20 which include the usual prisms (not shown). The microscope 19 includes the conventional focusing mechanism 21 and objective lenses 22. The light projector and lens system, 2, 4 and 5 of FIG. 1, is shown generally by the reference character 22a.

In FIG. 7 there is shown diagrammatically one form of stereophotogrammetric apparatus by which, the actual contours of the tear layer of the eye, as appearing in the stereonegatives thereof may be determined with precision. The stereophotogrammetric methods employed for actually reproducing the surface contours of the eye are well known and have long been used in connection with aerial photography. Generally speaking, this procedure involves making diapositives of the two negatives which result from the stereophotograph of the eye, and these diapositives 23 are placed in suitable stereo-projectors indicated generally at 23a in FIG. 7. These diapositives when properly oriented in space, corresponding to the points from which the two stereonegatives were taken, will produce in space, a three-dimensional image of the eye, showing the actual surface contours of the tear layer thereof. Then, by conventional and known methods, these contours are graphically transferred to a datum plane or sheet 25 on the table 26 by a stylus or scriber 27 carried by the movable screen device 24. These measurements of elevation contours may be utilized in designing the eye contacting surface of a contact lens, the contours of which will conform substantially to the actual contours of the tear layer of the eye on which the lens is to be supported. Typical of photogrammetric projection apparatus as illustrated in FIG. 5 are the Kelsh machines, examples of which will be found in Patents No. 2,492,870 and 2,833,178.

Having thus described the invention it is apparent that the invention provides a method by which the invisible tear surface of the eye which overlies the cornea and sclera thereof may be rendered visible for photographic reproduction without distorting the surface contours thereof. Furthermore, the process entails directly photographing the eye rather than photographing reflections, projections or enlargements thereof, as has sometimes been proposed in the prior art, thus, enabling the operator to reproduce with a greater degree of precision the minute irregularities in the exposed surface of the tear layer.

It will be understood by those skilled in the art that the invention as here described and illustrated is but for the purpose of example only and that various changes may be made therein, without departing from the spirit of the invention which is set forth more clearly in the appended claims.

What we claim is:

1. In a photogrammetric method of ascertaining the surface contours of an eye to be fitted with a contact lens the steps of depicting on the exposed surface of the substantially transparent tear layer which overlies the anterior epithelium of the cornea and sclera of the eye a multiplicity of photographically reproducible contiguous areas of contrasting light density to thereby render discernible surface irregularities existing in the exposed surface of said tear layer, increasing the photographic reproducibility of the patterned surface of the tear layer by causing the tear layer of the cornea and sclera of the eye to absorb a biological stain capable of emitting a visible light ray in the presence of ultraviolet light, directing an ultraviolet light onto the stained tear layer of said eye thereby to accentuate the contrast between said contiguous areas of contrasting light density, and stereoscopically photographing said continuous areas.

2. In a photogrammetric method of ascertaining the surface contours of an eye to be fitted with a contact lens the steps of depicting on the exposed surface of the substantially transparent tear layer covering the anterior epithelium of the cornea and sclera of the eye a multiplicity of photographically reproducible contiguous areas of contrasting light density to thereby render discernible surface irregularities existing in the exposed surface of said tear layer, increasing the photographic reproducibility of the patterned surface of the tear layer by causing the tear layer overlying the cornea and sclera portions of the eye to absorb a biological stain capable of emitting a visible light ray in the presence of ultra violet light, directing an ultraviolet light onto the stained tear layer of said eye thereby to accentuate the contrast between said contiguous areas of contrasting light density, stereoscopically photographing said contiguous areas, producing diapositives from the negatives of the stereophotographs, and stereoscopically projecting said diapositives to create a three-dimensional image of the eye in space from which the surface contours of the cornea and sclera portions of the eye can be determined.

3. The method of rendering minute irregularities in an exposed surface of a substantially transparent layer of human tissue photographically reproducible comprising optically projecting onto said surface a beam of light modified by passage through a light permeable filter bearing a design composed of a plurality of contiguous areas differing in light density whereby to illuminate the surface of said tissue with varying degrees of light intensity, causing said transparent tissue layer to absorb a biological stain capable of emitting a visible light ray in the presence of ultraviolet light and then flooding said stained tissue with ultraviolet light and then photographing said surface while so illuminated by said ultraviolet light.

4. The method of claim 3 wherein contiguous areas of said filter are of contrasting colors.

5. The method of claim 3 wherein said tissue is the tear layer covering the anterior epithelium of the cornea and sclera of an eye.

6. The method recited in claim 3 wherein said contiguous areas are stereoscopically photographed while flooded with ultraviolet light, producing diapositives from said negatives of the stereophotographs and stereoscopically projecting said diapositives to create a three-dimensional image of said surface in space from which the surface contours of said surface can be determined.

7. The method described in claim 3 wherein the biological stain is fluorescein.

References Cited by the Examiner

UNITED STATES PATENTS

| | | | |
|---|---|---|---|
| 1,596,458 | 8/26 | Schiesari | 88—24 |
| 1,760,208 | 5/30 | Pfeiffer | 95—11 |
| 2,350,796 | 6/44 | Morioka | 88—24 X |

NORTON ANSHER, *Primary Examiner.*

JOHN M. HORAN, *Examiner.*